(12) United States Patent
Choi et al.

(10) Patent No.: US 7,530,727 B2
(45) Date of Patent: May 12, 2009

(54) BACKLIGHT ASSEMBLY AND DISPLAY APPARATUS HAVING THE SAME

(75) Inventors: Seong-Sik Choi, Seoul (KR); Dong-Lyoul Shin, Suwon-si (KR); Kui-Yong Choi, Suwon-si (KR); Jae-Hwan Chun, Suwon-si (KR); Doo-Won Lee, Seoul (KR)

(73) Assignee: Samsung Electronics, Co., Ltd., Gyeonggi-do (KR)

( * ) Notice: Subject to any disclaimer, the term of this patent is extended or adjusted under 35 U.S.C. 154(b) by 40 days.

(21) Appl. No.: 11/330,002

(22) Filed: Jan. 10, 2006

(65) Prior Publication Data

US 2006/0170838 A1 Aug. 3, 2006

(30) Foreign Application Priority Data

Jan. 10, 2005 (KR) .................................. 2005-2250

(51) Int. Cl.
*F21V 7/04* (2006.01)
(52) U.S. Cl. .................. 362/632; 362/600; 362/633; 362/634; 349/58
(58) Field of Classification Search .................. 362/600, 362/609, 632–634; 349/58
See application file for complete search history.

(56) References Cited

U.S. PATENT DOCUMENTS

| | | | |
|---|---|---|---|
| 2002/0044437 A1* | 4/2002 | Lee | 362/31 |
| 2004/0062034 A1* | 4/2004 | Hsieh et al. | 362/97 |
| 2005/0063174 A1* | 3/2005 | Kaminsky et al. | 362/31 |

* cited by examiner

*Primary Examiner*—Sandra L. O'Shea
*Assistant Examiner*—Meghan K. Dunwiddie
(74) *Attorney, Agent, or Firm*—Haynes and Boone, LLP

(57) ABSTRACT

A backlight assembly includes a receiving container including a bottom plate having a lower face and an upper face opposite the lower face, a sidewall part protruding from edge portions of the bottom plate, and a plurality of light property controlling parts disposed on the upper face and having a substantially wedge shaped cross-section. The backlight further includes a light source disposed between adjacent light property controlling parts, and the light source is received by the receiving container, wherein a distance between a center of the light source and the upper face is substantially equal to a height of at least one of the plurality of light property controlling parts. The backlight assembly may increase the brightness and brightness-uniformity of light.

12 Claims, 7 Drawing Sheets

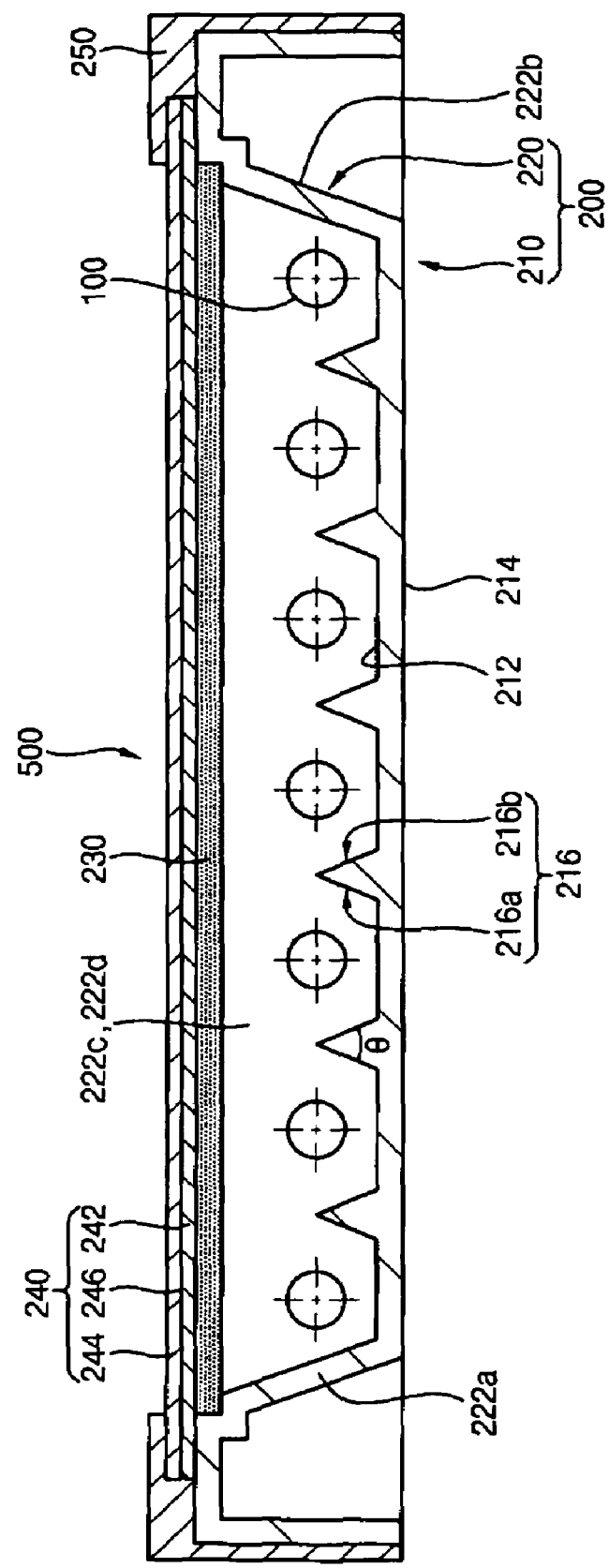

BACKLIGHT ASSEMBLY AND DISPLAY APPARATUS HAVING THE SAME

CROSS REFERENCE TO RELATED APPLICATION

This application relies upon and claims priority to Korean Patent Application No. 2005-2250 filed on Jan. 10, 2005, the disclosure of which is incorporated by reference in its entirety herein.

BACKGROUND OF THE INVENTION

1. Field of the Invention

The present invention relates to a backlight assembly and a display apparatus including the backlight assembly. More particularly, the present invention relates to a backlight assembly and a display apparatus capable of enhancing brightness and increasing a uniformity thereof.

2. Description of the Related Art

In general, a liquid crystal display (LCD) apparatus requires a backlight assembly. The LCD apparatus displays an image by using light that is provided by the backlight assembly.

The LCD apparatus includes an LCD panel displaying an image, a light source that provides light to the LCD panel, and a receiving container for receiving the LCD panel and the light source.

The receiving container includes a reflective plate disposed on a bottom plate of the receiving container to increase brightness.

However, the reflective plate increases a size of the LCD apparatus, a complexity of the manufacturing process, and a number of display apparatus components, for example.

SUMMARY OF THE INVENTION

The present invention can provide a backlight assembly of reduced size having fewer components, and thus a simpler manufacturing process, as well as, improving brightness and uniformity thereof.

The present invention also provides a display apparatus including the above backlight assembly.

In accordance with an aspect of the present invention, a backlight assembly includes a receiving container including a bottom plate having a lower face and an upper face opposite the lower face, a sidewall part protruding from edge portions of the bottom plate, and a plurality of light property controlling parts disposed on the upper face and having a substantially wedge shaped cross-section. The backlight further includes a light source disposed between adjacent light property controlling parts, and the light source is received by the receiving container, wherein a distance between a center of the light source and the upper face is substantially equal to a height of at least one of the plurality of light property controlling parts.

In accordance with another aspect of the present invention, a display apparatus includes a receiving container including a bottom plate having a lower face and an upper face opposite the lower face, a sidewall part protruding from edge portions of the bottom plate, and plurality of light property controlling parts disposed on the upper face. The sidewall part includes a pair of substantially parallel first sidewalls extending along a first direction, and a pair of substantially parallel second sidewalls extending along a second direction substantially perpendicular to the first direction. Each first sidewall connects to both second sidewalls to form the sidewall part. The light property controlling parts have a substantially wedge shaped cross-section and extend substantially parallel to the first sidewalls. The display apparatus further includes a light source disposed between adjacent light property controlling parts, a diffusion member to diffuse light, and a display panel to convert light diffused from the diffusion member into an image. A distance between a center of the light source and the upper face is substantially equal to a height of at least one of the plurality of light property controlling parts. The light source, the diffusion member, and the display panel are received by the receiving container.

In accordance with the present invention, the display apparatus may improve a brightness and brightness-uniformity of light exiting the backlight assembly.

BRIEF DESCRIPTION OF THE DRAWINGS

The above and other features and advantages of the present invention will become readily apparent by reference to the following detailed description when considered in conjunction with the accompanying drawings.

FIG. 9 is a cross-sectional view illustrating a display apparatus according to an embodiment of the present invention.

DESCRIPTION OF THE EMBODIMENTS

Figure 1:
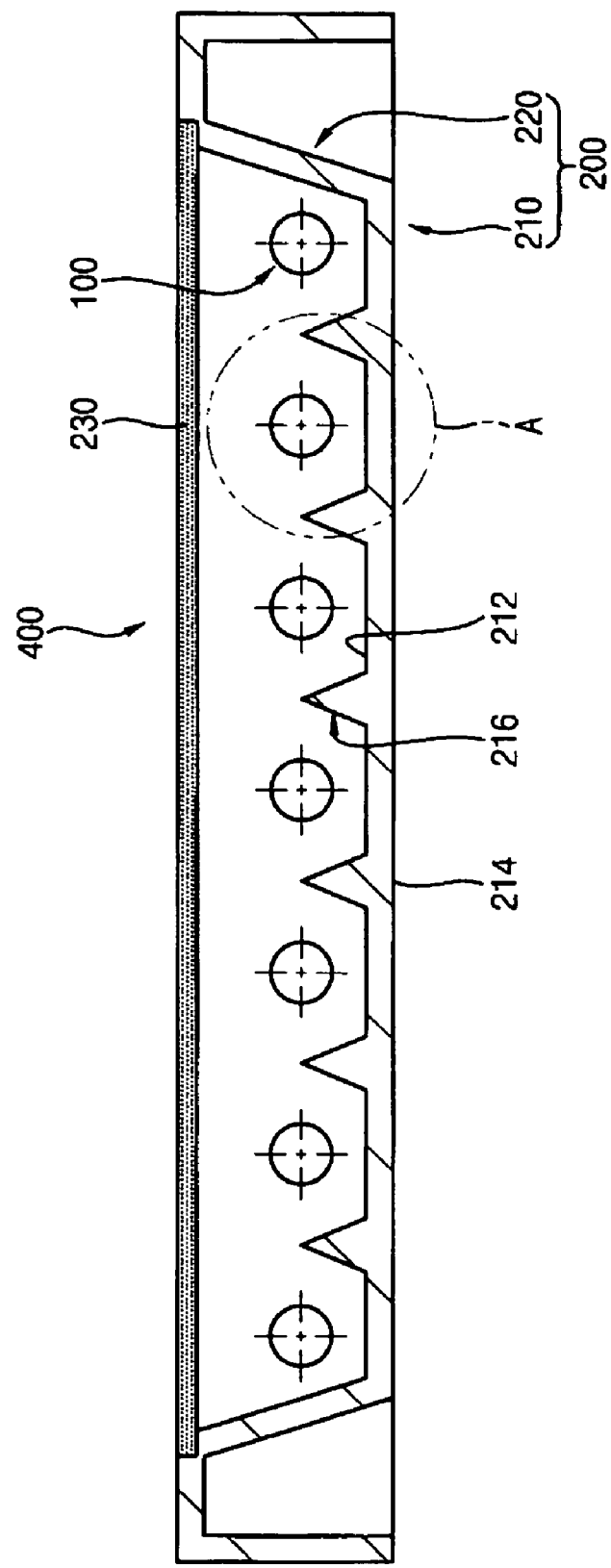
FIG. 1 is a cross-sectional view illustrating a backlight assembly according to embodiment of the present invention.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. The same reference numerals will be used to describe the same or like parts throughout.

Figure 2:
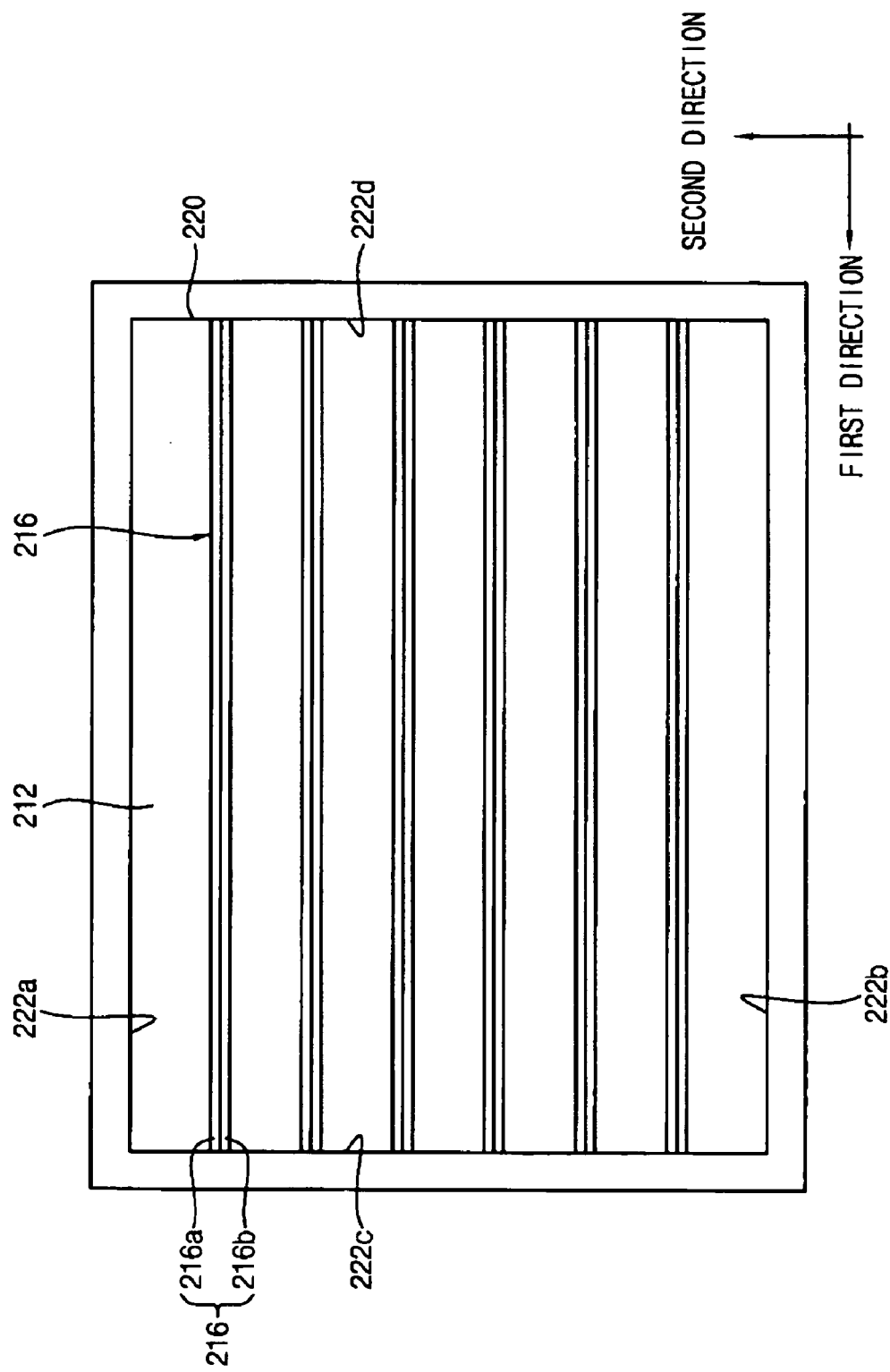
FIG. 2 is a plan view illustrating a receiving container in FIG. 1.

Referring to FIG. 1 and FIG. 2, a backlight assembly 400 may include a light source 100 and a receiving container 200 that receives the light source 100.

The receiving container 200 may include a bottom plate 210, a light property controlling part 216 and a sidewall part 220.

The receiving container 200 may include a reflective metal such as aluminum or an aluminum alloy, for example. Alternatively, the receiving container 200 may include a resin such as a polyethylene terephthalate (PET). The resin can include beads on its surface to enhance reflectance.

The bottom plate 210 can have a substantially rectangular shape. The bottom plate has an upper face 212 facing the light source 100 and an opposite lower face 214. An edge portion of the bottom plate 210 is connected to the sidewall part 220. The sidewall part 220 has a pair of first sidewalls 222a and 222b, and a pair of second sidewalls 222c and 222d. A length of second sidewalls 222c and 222d is shorter along a second direction than a length of first sidewalls 222a and 222b along a first direction. The first sidewalls 222a and 222b are connected to the second sidewalls 222c and 222d.

The light property controlling part 216 may be formed on the upper face 212 of the bottom plate 210. The light property controlling part 216 increases brightness of light and a uniformity thereof.

The light controlling part 216 extends along the first direction that is substantially parallel to the first sidewalls 222a and 222b. A distance between adjacent light controlling parts 216 is substantially constant.

The light property controlling part 216 projects upwardly from the upper face 212. The light property controlling part 216 has a substantially wedge shaped cross-section, and extends substantially parallel to the first sidewalls 222a and 222b.

The light controlling part 216 has a first surface 216a and a second surface 216b connected to the first surface 216a. The first and second surfaces 216a and 216b reflect light generated from the light source 100 and change an advance direction of light to increase brightness and brightness-uniformity of a light exiting the backlight assembly 400.

Accordingly, the light controlling part 216 may control the brightness and the brightness-uniformity of the light exiting the backlight assembly 400.

The light source 100 is received in the receiving container 200 including the bottom plate 210 and the sidewall part 220.

The light source 100 may include a cold cathode fluorescent lamp (CCFL). The CCFL has characteristics such as, for example, relatively high brightness, high endurance, and low heat generation.

The light source 100 may have a shape such as, for example, a linear pipe shape, a curved pipe shape, a U-shape, or a C-shape. Here, a light source 100 having a substantially linear pipe (or tubular) shape is shown.

The CCFL lamp 100 having the linear pipe shape is disposed between the light property controlling parts 216.

Figure 3:
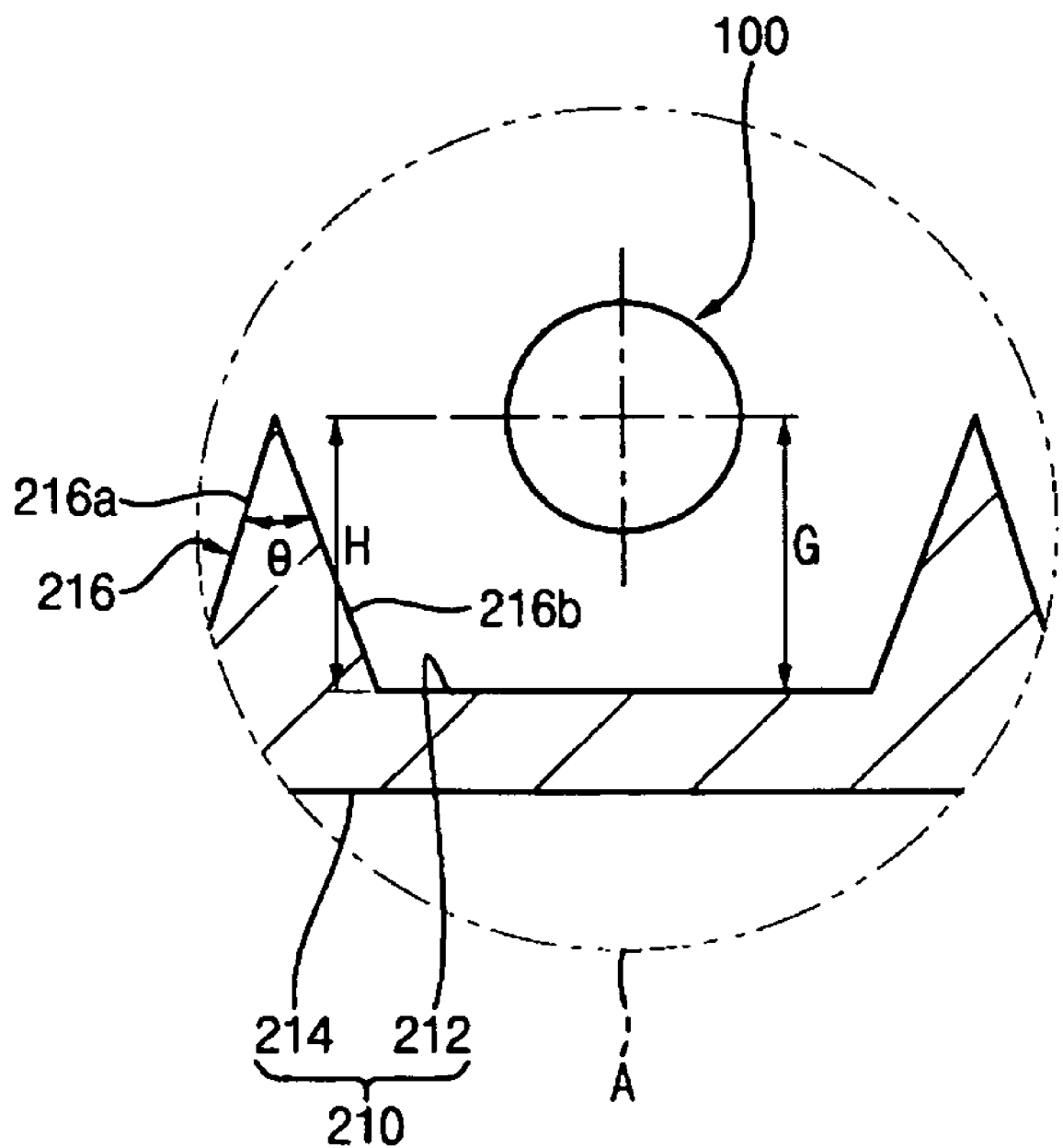
FIG. 3 is an enlarged view illustrating portion 'A' in FIG. 1.

Referring to FIG. 3, a distance between a center of the light source 100 and the upper surface 212 may be substantially equal to a height 'H' of light property controlling part 216 may greatly increase a brightness and a brightness-uniformity of the light.

Figure 4:
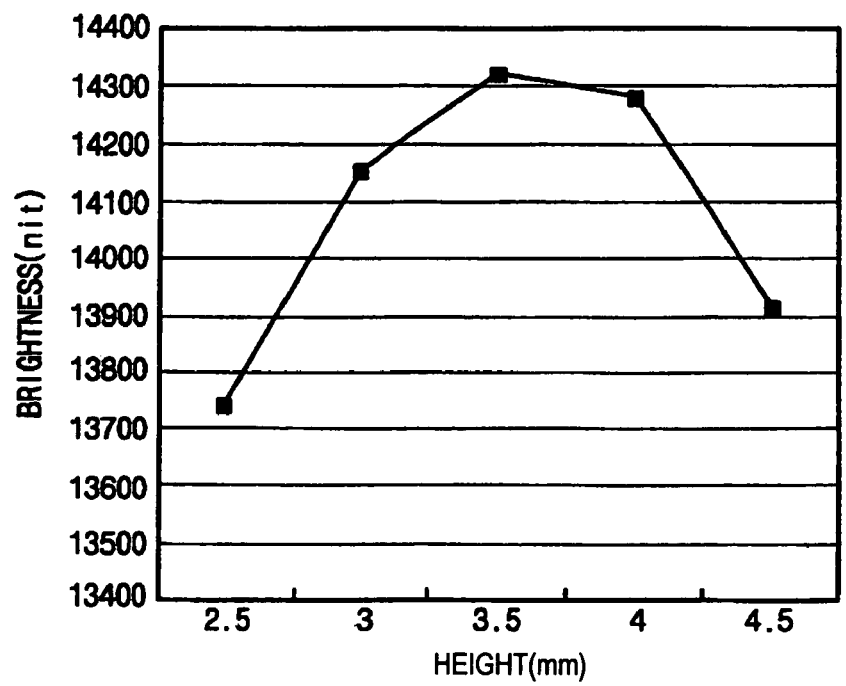
FIG. 4 is a graph illustrating a relationship between brightness of light exiting the back light assembly in FIG. 1 and a height of a light property controlling part.

FIG. 4 is a graph illustrating a relationship between brightness of light exiting the backlight assembly of FIG. 1 and the height of a light controlling part.

The height 'H' of the light controlling part 216 was set at about 2.5 mm, about 3.0 mm, about 3.5 mm, about 4.0 mm and about 4.5 mm, respectively, and the brightness of light exiting the backlight assembly 400 was measured when the distance between the center of the light source 100 and the bottom plate upper face 212 was about 3.5 mm.

When the height 'H' of the light controlling part 216 was set at about 2.5 mm, about 3 mm, about 3.5 mm, about 4 mm and about 4.5 mm, the brightness of a light exiting the backlight assembly 400 was measured to be about 13,700 nit, about 14,150 nit, about 14,300 nit, about 14,250 nit and about 13,900 nit, respectively. Therefore, when the height 'H' of the controlling part 216 is substantially equal to the distance between the center of the light source 100 and the upper face 212, which is about 3.5 mm here, the brightness of the light exiting the backlight assembly 400 is maximized.

Figure 5:
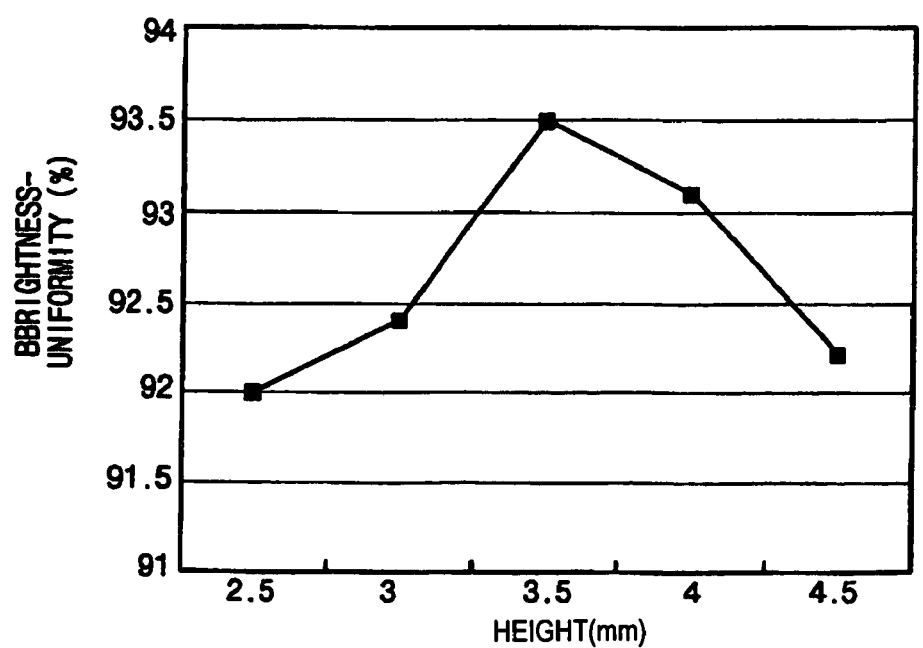
FIG. 5 is a graph illustrating a relationship between brightness-uniformity of a light exiting the backlight assembly in FIG. 1 and a height of a light property controlling part.

FIG. 5 is a graph illustrating a relationship between a brightness-uniformity of light exiting the backlight assembly in FIG. 1 and a height of a light controlling part.

Again, a height 'H' of the light controlling part 216 was set at about 2.5 mm, about 3 mm, about 3.5 mm, about 4 mm and about 4.5 mm, respectively, and a brightness-uniformity of light exiting the backlight assembly 400 was measured when the distance between the center of the light source 100 and the bottom plate upper face 212 was about 3.5 mm.

When the height 'H' of the light controlling part 216 was about 2.5 mm, about 3.0 mm, about 3.5 mm, about 4.0 mm and about 4.5 mm, the brightness-uniformities of light exiting the backlight assembly 400 was measured to be about 92%, about 92.4%, about 93.5%, about 93.1% and about 92.2%, respectively. Therefore, when the height 'H' of the controlling part 216 is substantially equal to the distance between the center of the light source 100 and the upper face 212, which is about 3.5 mm here, the brightness-uniformity of light exiting the backlight assembly 400 is also maximized.

Further, when the height of the light controlling part 216 was less than about 2.5 mm or exceeded about 4.5 mm, the brightness and the brightness-uniformity of the light exiting the backlight assembly 400 remarkably decreased, thereby deteriorating a display quality. Therefore, the height of the light controlling part 216 is preferably between about 2.5 mm and about 4.0 mm.

Referring again to FIG. 1, the light exiting the backlight assembly 400 is provided to a diffusion plate 230 to diffuse the light provided thereto.

Figure 6:
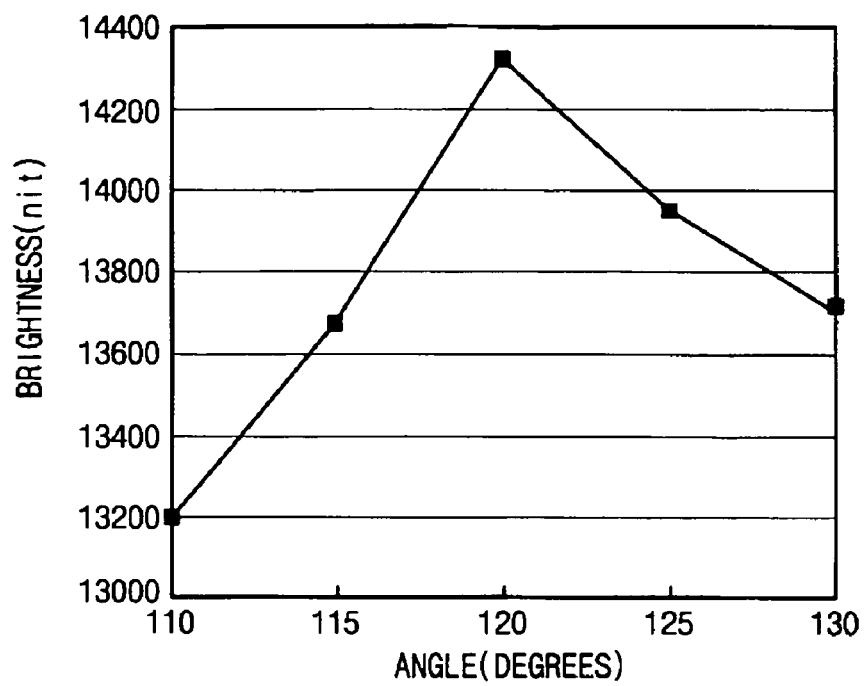
FIG. 6 is a graph illustrating a relationship between brightness of a light exiting the backlight assembly in FIG. 1 and a shape of a light property controlling part.

FIG. 6 is a graph illustrating a relationship between brightness of a light exiting the backlight assembly in FIG. 1 and different shapes of a light controlling part.

The light controlling part 216 had a height of about 3.5 mm, and the distance between the center of the light source 100 and the bottom plate upper face 212 was about 3.5 mm.

When the angle (θ in FIG. 3) between the first surface 216a and the second surface 216b was set at about 110 degrees, about 115 degrees, about 125 degrees, about 130 degrees, and about 135 degrees, the brightness of a light exiting the backlight assembly 400 was measured to be about 13,200 nit, about 13,600 nit, about 13,900 nit and about 13,700 nit, respectively. The brightness of the light exiting the backlight assembly 400 is maximized when the angle between the first surface 216a and the second surface 216b is about 120 degrees.

Figure 7:
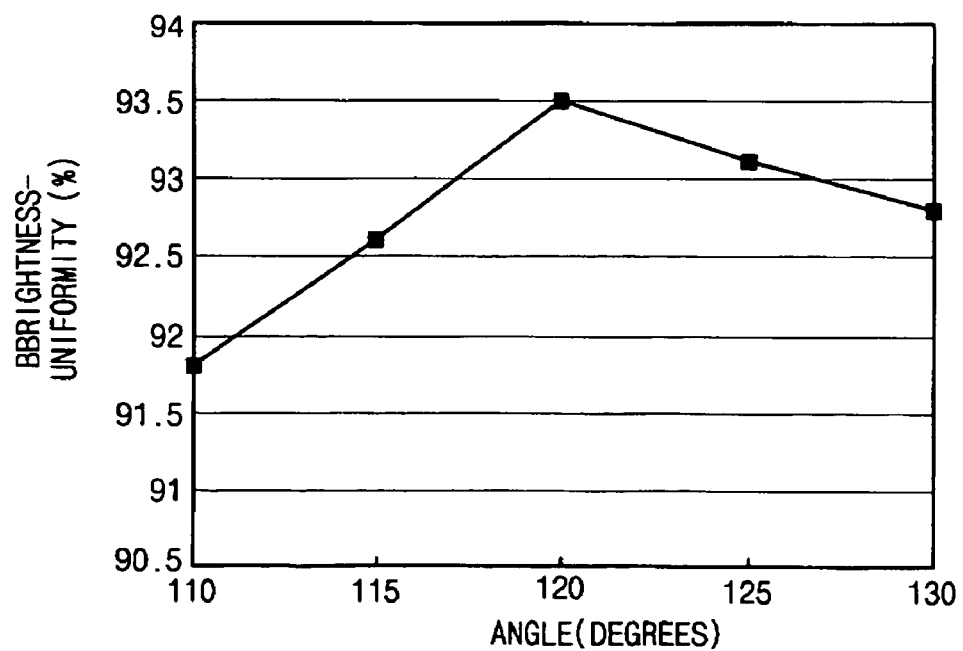
FIG. 7 is a graph illustrating a relationship between brightness-uniformity of a light exiting the backlight assembly in FIG. 1 and a shape of a light property controlling part.

FIG. 7 is a graph illustrating a relationship between brightness-uniformity of light exiting the backlight assembly in FIG. 1 and shapes of a light controlling part.

When the angle between the first surface 216a and the second surface 216b was again set at about 110 degrees, about 115 degrees, about 120 degrees, about 125 degrees, and about 130 degrees, the brightness-uniformities of light exiting from the backlight assembly 400 were measured to be about 91.8%, about 92.6%, about 93.5%, about 93.1% and about 92.6%, respectively. The brightness-uniformity of light exiting the backlight assembly 400 was also maximized at an angle of about 120 degrees.

When the angle between first surface 216a and second surface 216b was less than about 110 degrees or exceeded about 130 degrees, the brightness-uniformity of the light exiting the backlight assembly 400 remarkably decreases thereby deteriorating display quality. Thus, the angle between the first surface 216a and the second surface 216b is preferably between about 115 degrees and about 125 degrees.

Figure 8:
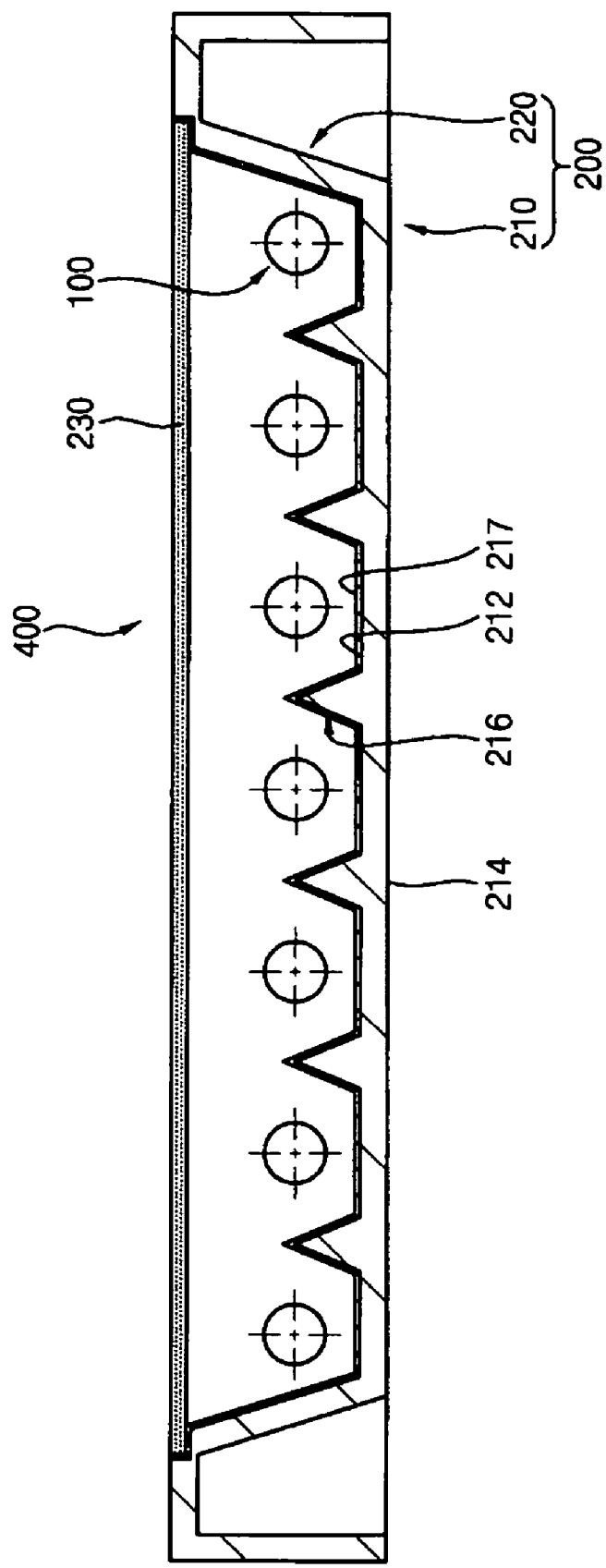
FIG. 8 is cross-sectional view illustrating a backlight assembly according to another exemplary embodiment of the present invention.

Referring to FIG. 8, in a backlight assembly according to another embodiment of the invention, a light reflective layer 217 may be formed on the bottom plate upper face 212 of receiving container 200. The light reflective layer 217 can be formed by spraying a light reflective material such as titanium oxide and aluminum oxide, for example, on the upper face 212 of the bottom plate 210. The light reflective material is sprayed on the upper face 212 to form a thin film layer thereon. Alternatively, the light reflective layer 217 may be further formed on an inner surface of the sidewall part 220.

Now referring to FIG. 9, a display apparatus 500 may include a light source 100, a receiving container 200 that receives the light source 100, a diffusion member 230, a display panel 240, and a frame 250.

Here the diffusion member 230 diffuses a light generated from the light source 100 toward the display panel 240 to improve a display quality of an image outputted therefrom.

The display panel 240 includes a thin film transistor (TFT) substrate 242, a color filter substrate 244, and a liquid crystal layer 246.

Pixel electrodes (not shown) are disposed on the TFT substrate 242 in a matrix shape, and a TFT is disposed on each of the pixel electrodes. The TFT applies a driving signal generated from a printed circuit board (not shown) to the pixel electrodes.

The color filter substrate 244 includes a common electrode and a color filter that are disposed on an area corresponding to the pixel electrodes.

The liquid crystal layer 246 is disposed between the color filter substrate 244 and the TFT substrate 242 to change an orientation of liquid crystals, thereby varying a transmittance of light to display an image.

As described above, the brightness and brightness-uniformity of light exiting the backlight assembly may increase, which in turn increases the brightness and brightness-uniformity of an image outputted from the display panel. In such a manner, a display quality of a display apparatus may be improved.

Having thus described exemplary embodiments of the present invention, it is to be understood that the invention is not to be limited by particular details set forth in the above description as many variations thereof as know those skilled in the art are possible without departing from the spirit or scope thereof as recited in the appended claimer.

What is claimed is:

1. A backlight assembly comprising:
   a receiving container comprising:
      a bottom plate including a lower face and an upper face opposite the lower face;
      a sidewall part protruding from edge portions of the bottom plate; and
      a plurality of light property controlling parts disposed on the upper face and having a substantially wedge shaped cross-section; and
   a light source disposed between adjacent light property controlling parts, the light source being received by the receiving container,
   wherein a distance between a center of the light source and the upper face is substantially equal to a height of at least one of the plurality of light property controlling parts,
   wherein at least one of the plurality of light controlling parts comprises a first surface and a second surface connected to one another to form an angle, and
   wherein the angle formed by the first surface and the second surface is between about 110 degrees and about 130 degrees.

2. The backlight assembly of claim 1, wherein a height of at least one of the plurality of light property controlling parts is between about 2.5 mm and about 4.5 mm.

3. The backlight assembly of claim 2, wherein a distance between a center of the light source and the upper face is substantially equal to the height of the at least one of the plurality of light property controlling parts.

4. The backlight assembly of claim 1, wherein a height of at least one of the plurality of light property controlling parts is between about 3.5mm and about 4.0 mm.

5. The backlight assembly of claim 1, wherein:
   the sidewall part comprises:
      a pair of substantially parallel first sidewalls extending along a first direction; and
      a pair of substantially parallel second sidewalls extending along a second direction that is substantially perpendicular to the first direction,
   wherein each first sidewall connects both second sidewalls to form the sidewall part, and
   wherein the first side walls extend substantially parallel to the plurality of light property controlling parts.

6. The backlight assembly of claim 1 wherein the angle formed by the first surface and the second surface is between about 115 degrees and about 130 degrees.

7. The backlight assembly of claim 1, further comprising a light reflective layer formed on the upper face of the bottom plate.

8. The backlight assembly of claim 1, wherein the light source comprises a cold cathode fluorescent lamp.

9. The backlight assembly of claim 1, further comprising a diffusion plate disposed on the sidewall part.

10. The backlight assembly of claim 1, wherein the receiving container comprises a polyethylene terephthalate (PET) resin having a resin surface, the resin surface including a plurality of beads.

11. A display apparatus comprising:
   a receiving container comprising:
      a bottom plate including a lower face and an upper face opposite the lower face;
      a sidewall part protruding from edge portions of the bottom plate comprising:
         a pair of substantially parallel first sidewalls extending along a first direction; and
         a pair of substantially parallel second sidewalls extending along a second direction substantially perpendicular to the first direction,
      wherein each first sidewall connects to both second sidewalls to form the sidewall part; and
   a plurality of light property controlling parts disposed on the upper face and having a substantially wedge shaped cross-section, the plurality of light controlling parts extending substantially parallel to the first sidewalls; and
   a light source disposed between adjacent light property controlling parts, a distance between a center of the light source and the upper face is substantially equal to a height of at least one of the plurality of light property controlling parts, the light source being received by the receiving container;

a diffusion member received by the receiving container to diffuse light; and a display panel received by the receiving container to convert light diffused from the diffusion member into an image, wherein at least one of the plurality of light controlling parts has a first surface and a second surface connected to one another to form an angle, the angle between the first surface and the second surface being between about 110 degrees and about 130 degrees.

12. The display apparatus of claim 11, wherein the height of the at least one of the plurality of light property controlling parts is between about 2.5 mm and about 4.5 mm.

* * * * *